United States Patent
Sapir et al.

(10) Patent No.: US 10,210,592 B2
(45) Date of Patent: Feb. 19, 2019

(54) SYSTEM, METHOD, AND COMPUTER PROGRAM PRODUCT FOR EFFICIENT AGGREGATION OF DATA RECORDS OF BIG DATA

(71) Applicant: TEOCO LTD., Rosh Ha'ayin (IL)

(72) Inventors: Yoav Sapir, Rehovot (IL); Ori Cahana, Modiin (IL)

(73) Assignee: TEOCO Ltd., Rosh Ha'ayin (IL)

( * ) Notice: Subject to any disclaimer, the term of this patent is extended or adjusted under 35 U.S.C. 154(b) by 405 days.

(21) Appl. No.: 14/672,230

(22) Filed: Mar. 30, 2015

(65) Prior Publication Data

US 2015/0278269 A1    Oct. 1, 2015

Related U.S. Application Data

(60) Provisional application No. 61/972,344, filed on Mar. 30, 2014.

(51) Int. Cl.
*G06T 1/20*    (2006.01)

(52) U.S. Cl.
CPC ..................... *G06T 1/20* (2013.01)

(58) Field of Classification Search
None
See application file for complete search history.

(56) References Cited

U.S. PATENT DOCUMENTS

| | | | |
|---|---|---|---|
| 5,146,590 A | | 9/1992 | Lode et al. |
| 5,325,290 A | * | 6/1994 | Cauffman .......... G06Q 30/0284 379/114.01 |
| 5,978,940 A | * | 11/1999 | Newman .............. H04Q 3/0087 714/712 |
| 6,675,175 B2 | | 1/2004 | Branch et al. |
| 6,987,845 B1 | * | 1/2006 | Van Natter ....... G06F 17/30595 379/126 |
| 7,882,312 B2 | | 2/2011 | Spencer |
| 8,374,986 B2 | | 2/2013 | Indeck et al. |
| 2010/0041365 A1 | * | 2/2010 | Lott ..................... G06Q 30/016 455/406 |
| 2011/0289061 A1 | * | 11/2011 | Lew .................. G06F 17/30336 707/696 |
| 2014/0176583 A1 | * | 6/2014 | Abiezzi ..................... G06T 1/20 345/522 |

(Continued)

*Primary Examiner* — Joni Richer

(74) *Attorney, Agent, or Firm* — ATFirm PLLC; Ralph P. Albrecht

(57) ABSTRACT

A computerized method, system, and computer program product can allow for processing by a processor data records (xDRs). The method can include receiving by the processor xDRs, each xDR including a vector of unique data fields, the xDRs forming together a stream. The stream can be stored by the processor in a memory of a general purpose graphic processor unit (GPGPU). An index vector of xDRs can be created by the processor, wherein each xDR is assigned a unique index identifier, and stored by the processor in a memory of the GPGPU. The index vector of xDRs is sorted with respect to at least a key of at least a unique data element selected. The sorted index vector can be stored in the memory of the GPGPU. A selection of at least the unique data field can be performed and aggregation of the stream performed with respect to the selection.

34 Claims, 4 Drawing Sheets

(56) References Cited

U.S. PATENT DOCUMENTS

| | | | |
|---|---|---|---|
| 2014/0204080 A1* | 7/2014 | Goel | G06T 1/20 |
| | | | 345/419 |
| 2014/0344296 A1* | 11/2014 | Chawathe | G06F 17/30241 |
| | | | 707/755 |
| 2015/0049107 A1* | 2/2015 | Park | G06T 15/005 |
| | | | 345/582 |
| 2015/0269205 A1* | 9/2015 | Ma | G06F 17/30306 |
| | | | 707/614 |

* cited by examiner

SYSTEM, METHOD, AND COMPUTER PROGRAM PRODUCT FOR EFFICIENT AGGREGATION OF DATA RECORDS OF BIG DATA

CROSS REFERENCE TO RELATED APPLICATIONS

The present disclosure is a US NonProvisional patent application, which claims the benefit under 35 U.S.C. Section 119(e) of U.S. Provisional Patent Application No. 61/972,344, Conf. No. 8867, filed Mar. 30, 2014, entitled, "A System and Method for Efficient Aggregation of Data Records of Big Data," the content of which is incorporated herein by reference in its entirety.

BACKGROUND

Field of the Disclosure

The disclosure generally relates to processing of call data records and specifically to processing of call data records on a general purpose graphic processing unit (GPGPU).

Related Art

Telecommunications networks are constantly generating more and more data representative of client devices utilizing the network. It is advantageous for the network provider to understand and identify usage patterns of the network by client devices. Data is usually stored in data records, collectively known as xDRs. A Call Data Record (CDR) for example, will store data relating to a client device performing a call, such as, e.g., but not limited to, a client identifier, call duration, signal quality, etc. The data may be stored in unique data fields. A unique data field may be, for example, signal quality. Values of the unique data fields may be selected from a list of keys. Keys may be identical for more than one record. A key may be, for example a specific client device model, in a field named "device model." As usage grows, processing vast amounts of data is a resource draining problem. Typically, as the number of xDRs rises linearly, the amount of time required to process the xDRs may rise between $N \cdot Log(N)$ to $N^2$ where N is the number of xDRs which are processed.

It would therefore be advantageous to provide a solution to process a large number of data records in a more efficient manner.

SUMMARY

The disclosure sets forth systems, methods and computer program products relating to a computerized method for processing, by at least one processor, a plurality of data records (DRs), the method, according to one exemplary embodiment, can include: receiving, by the at least one processor, a plurality of DRs, each DR can include a vector of unique data fields; storing, by the at least one processor, the plurality of DRs in a primary memory; creating, by the at least one processor, an index vector of DRs, wherein each DR of the plurality of DRs is assigned a unique index identifier; storing the index vector of DRs in a memory of a general purpose graphic processing unit (GPGPU); sorting the index vector of DRs by the GPGPU related to at least a key of the at least a unique data field; and storing the sorted index vector of DRs in the memory of the GPGPU.

According to an exemplary embodiment, the computerized method can further include receiving a selection of at least a unique data field from the vector of unique data fields; providing a plurality of unique data field values to the GPGPU; and creating a sorted vector of the plurality of unique data field values related to the sorted index vector of DRs.

According to an exemplary embodiment, the computerized method can further include reducing, by the GPGPU, the stream by at least a key of the at least a unique data field.

According to an exemplary embodiment, the computerized method can further include where reducing can further include selecting an aggregating unique data field; and aggregating the values of each unique data field of the sorted plurality of unique data field values related to at least a key of the aggregating data field.

According to an exemplary embodiment, the computerized method can further include parsing, by the at least one processor, an unparsed DR for each unparsed DR of the plurality of DRs.

According to an exemplary embodiment, the computerized method can further include transposing, by the at least one processor, each DR vector of the plurality of DRs, the plurality of transposed DRs can include together a transposed stream; and storing the transposed stream in the primary memory.

According to an exemplary embodiment, the computerized method can further include creating, by the at least one processor, a plurality of chunks from the plurality of DRs, each chunk can include at least a DR; performing the method on each chunk of the plurality of chunks.

According to an exemplary embodiment, the computerized method can further include merging the sorted index vector of each of the plurality of chunks to comprise a merged index vector.

According to an exemplary embodiment, the computerized method can further include receiving a selection of at least a unique data field from the vector of unique data fields; providing, for each chunk, a plurality of unique data field values to the GPGPU; and creating, for each chunk, a sorted vector of the plurality of unique data field values related to the sorted index vector of DRs.

According to an exemplary embodiment, the computerized method can further include reducing, by the GPGPU, each chunk by at least a key of the at least a unique data field.

According to an exemplary embodiment, the computerized method can further include selecting an aggregating unique data field; and aggregating the values of each unique data field of the sorted plurality of unique data field values related to at least a key of the aggregating data field.

According to an exemplary embodiment, the computerized method can further include merging the plurality of chunks.

According to an exemplary embodiment, the computerized method can include a plurality of unique data fields are selected and each unique data field is processed on a dedicated group of worker threads of the GPGPU.

According to an exemplary embodiment, the computerized method can include where the DR can include any of: a call data record (CDR) or an internet protocol data record (IPDR).

According to another exemplary embodiment, a system is set forth configured to process a plurality of data records (DRs), the system can include: at least one processor; a general purpose graphic processing unit (GPGPU); a network interface communicatively coupled to the GPGPU and the at least one processor; a first memory communicatively coupled to the GPGPU and the at least one processor, the first memory can include instructions that when executed configure the system to:

receive, by the at least one processor a plurality of DRs, each DR can include a vector of unique data fields; store, by the at least one processor, the plurality of DRs in a primary memory; create an index vector of DRs, wherein each DR of the plurality of DRs is assigned a unique index identifier; store the index vector of DRs in a GPGPU memory; sort the index vector of DRs by the GPGPU related to at least a key of the at least a unique data field; and store the sorted index vector of DRs in the memory of the GPGPU.

According to an exemplary embodiment, the system can include where the first memory can include an instruction that when executed causes the system to: receive a selection of at least a unique data field from the vector of unique data fields; provide a plurality of unique data field values to the GPGPU; and create a sorted vector of the plurality of unique data field values with respect to the sorted index vector of DRs.

According to an exemplary embodiment, the system can include where the first memory can include an instruction that when executed by the GPGPU causes the system to: reduce the stream by at least a key of the at least a unique data field.

According to an exemplary embodiment, the system can include where the first memory can include an instruction that when executed by the GPGPU causes the system to: select an aggregating unique data field; and aggregate the values of each unique data field of the sorted plurality of unique data field values related to at least a key of the aggregating data field.

According to an exemplary embodiment, the system can include where the first memory can include an instruction that when executed by the at least one processor causes the system to: parse an unparsed DR for each unparsed DR of the plurality of DRs.

According to an exemplary embodiment, the system can include where the first memory can include an instruction that when executed causes the system to: transpose each DR vector of the plurality of DRs by the at least one processor, the plurality of transposed DRs can include together a transposed stream; and store the transposed stream in the primary memory.

According to an exemplary embodiment, the system can include where the first memory can include an instruction that when executed causes the system to: create a plurality of chunks from the plurality of DRs by the at least one processor, each chunk can include at least a DR; perform the instructions with respect to each chunk of the plurality of chunks.

According to an exemplary embodiment, the system can include where the first memory can include further instructions that when executed configure the system to merge the sorted index vector of each of the plurality of chunks to comprise a merged index vector by the at least one processor.

According to an exemplary embodiment, the system can include where the first memory can include further instructions that when executed configure the system to: receive a selection of at least a unique data field from the vector of unique data fields by the at least one processor; provide, for each chunk, a plurality of unique data field values to the GPGPU; and create, for each chunk, a sorted vector of the plurality of unique data field values related to the sorted index vector of DRs.

According to an exemplary embodiment, the system can include where the first memory can include further instructions that when executed configure the system to: reduce, by the GPGPU, each chunk by at least a key of the at least a unique data field.

According to an exemplary embodiment, the system can include where the first memory can include instructions that when executed to reduce further configure the system to: select an aggregating unique data field; and aggregate, for each chunk, the values of each unique data field of the sorted plurality of unique data field values related to at least a key of the aggregating data field.

According to an exemplary embodiment, the system can include where the first memory can include further instructions that when executed configure the system to: merge the plurality of chunks.

According to an exemplary embodiment, the system can include where a plurality of unique data fields are selected and the first memory can include an instruction that when executed by the GPGPU causes the system to: process each unique data field on a dedicated group of worker threads of the GPGPU.

According to an exemplary embodiment, the system can include where the DR can include any of: a call data record (CDR) or an internet protocol data record (IPDR).

According to an exemplary embodiment, the system can further include where the at least one processor is a central processing unit (CPU).

According to an exemplary embodiment, the system can include where the system is further configured to determine the efficiency of execution of each instruction from the first memory by each of: the at least one processor, and the GPGPU.

According to an exemplary embodiment, the system can include where the at least one processor and the GPGPU each execute the instructions which either the at least one processor or the GPGPU is more efficient at executing.

According to yet another exemplary embodiment, a computer program product is set forth embodied on a computer accessible medium, the computer program product can include instructions, which when executed by at least one processor, can perform a method of processing a plurality of data records (DRs) on a general purpose graphic processing unit (GPGPU), the method can include:

receiving, by the at least one processor, a plurality of DRs, each DR can include a vector of unique data fields; storing, by the at least one processor, the plurality of DRs in a primary memory; creating, by the at least one processor, an index vector of DRs, wherein each DR of the plurality of DRs is assigned a unique index identifier; storing the index vector of DRs in a memory of the GPGPU; sorting the index vector of DRs by the GPGPU related to at least a key of the at least a unique data field; and storing the sorted index vector of DRs in the memory of the GPGPU.

According to an exemplary embodiment, the computer program product can include where the method can further include receiving by the at least one processor a selection of at least a unique data field from the vector of unique data fields; providing a plurality of unique data field values to the GPGPU; and creating a sorted vector of the plurality of unique data field values related to the sorted index vector of DRs.

According to an exemplary embodiment, the computer program product can include where the method can further include reducing, by the GPGPU, the stream by at least a key of the at least a unique data field.

According to an exemplary embodiment, the computer program product can include where the method can include where the reducing of the method can further include:

selecting an aggregating unique data field; and aggregating the values of each unique data field of the sorted plurality of unique data field values related to at least a key of the aggregating data field.

According to an exemplary embodiment, the computer program product can include where the method can further include parsing, by the at least one processor, an unparsed DR for each unparsed DR of the plurality of DRs.

According to an exemplary embodiment, the computer program product can include where the method can further include transposing, by the at least one processor, each DR vector of the plurality of DRs, the plurality of transposed DRs can include together a transposed stream; and storing the transposed stream in the primary memory.

According to an exemplary embodiment, the computer program product can include where the method can further include creating, by the at least one processor, a plurality of chunks from the plurality of DRs, each chunk can include at least a DR; and performing the method on each chunk of the plurality of chunks.

According to an exemplary embodiment, the computer program product can include where the method can further include merging the sorted index vector of each of the plurality of chunks to comprise a merged index vector, by the at least one processor.

According to an exemplary embodiment, the computer program product can include where the method can further include receiving a selection of at least a unique data field from the vector of unique data fields; providing, for each chunk, a plurality of unique data field values to the GPGPU; and creating, for each chunk, a sorted vector of the plurality of unique data field values related to the sorted index vector of DRs.

According to an exemplary embodiment, the computer program product can include where the method can further include reducing, by the GPGPU each chunk by at least a key of the at least a unique data field.

According to an exemplary embodiment, the computer program product can include where the reducing can further include: selecting an aggregating unique data field; and aggregating, for each chunk, the values of each unique data field of the sorted plurality of unique data field values related to at least a key of the aggregating data field.

According to an exemplary embodiment, the computer program product can include where the method can include merging the plurality of chunks.

According to an exemplary embodiment, the computer program product can include where a plurality of unique data fields are selected and each unique data field is processed on a dedicated group of worker threads of the GPGPU.

According to an exemplary embodiment, the computer program product can include where the DR can include any of: a call data record (CDR) or an internet protocol data record (IPDR).

According to an exemplary embodiment, the computer program product can include where the method can further include at least one of: executing the method on the at least one processor, wherein the at least one processor can include a central processing unit (CPU) communicatively coupled to a first memory; determining efficiency of execution by each of: the CPU, and the GPGPU; or executing instructions, by a CPU or the GPGPU, depending upon which of either the CPU or the GPGPU is more efficient at executing the instructions.

BRIEF DESCRIPTION OF THE DRAWINGS

The subject matter disclosed herein is particularly pointed out and distinctly claimed in the claims at the conclusion of the specification. The foregoing and other objects, features and advantages will be apparent from the following detailed description taken in conjunction with the accompanying drawings.

The accompanying drawings, which are included to provide a further understanding and are incorporated in and constitute a part of this specification, illustrate exemplary, and nonlimiting embodiments and together with the description serve to explain the principles disclosed herein. In the drawings, like reference numbers may indicate substantially similar, equivalent, or exemplary elements, and the left most digits in the corresponding reference number indicate the drawing in which an element first appears.

DETAILED DESCRIPTION OF VARIOUS EXEMPLARY EMBODIMENTS

Figure 1:
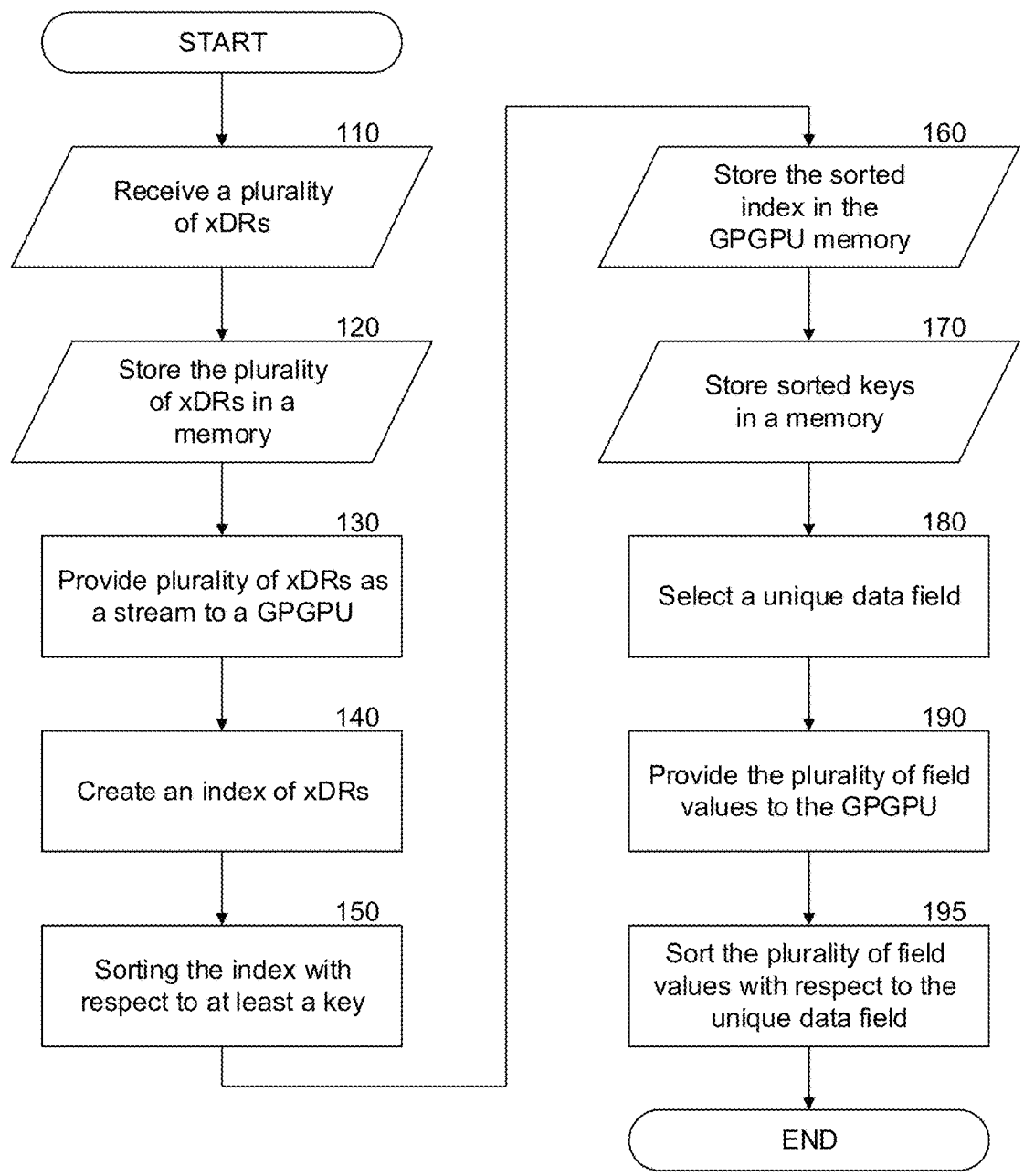
FIG. 1—is a flowchart of a computerized method for processing a plurality of data records (xDRs) on a general purpose graphic processing unit (GPGPU) according to an embodiment.

It is important to note that the embodiments disclosed herein are only examples of the many advantageous uses of the innovative teachings herein. In general, statements made in the specification of the present application do not necessarily limit any of the various claims. Moreover, some statements may apply to some disclosed features but not to others. In general, unless otherwise indicated, singular elements may be in plural and vice versa with no loss of generality. In the drawings, like numerals refer to like parts through several views.

A computerized method and system thereof, in an embodiment, allow for processing a plurality of data records (xDRs) on a general purpose graphic processor unit (GPGPU). The computerized method can include receiving a plurality of xDRs, each xDR comprising a vector of unique data fields, the plurality of xDRs forming together a stream. The stream is stored in a memory. An index vector of xDRs is created, wherein each xDR of the plurality of xDRs is assigned a unique index identifier. The index vector of xDRs is stored in a memory of the GPGPU. At least a unique data field is selected. The index vector of xDRs is sorted with respect to at least a key of the at least a unique data element. The sorted index vector is stored. A selection of at least a unique data field is performed and aggregation of the stream is performed relating to the selection.

FIG. 1 is an exemplary non-limiting flowchart of a computerized method for processing a plurality of data records (xDRs) on a general purpose graphic processing unit (GPGPU) according to an embodiment. In certain embodiments, a stream processor may be configured to perform some or all of the elements of the methods herein.

In 110 a plurality of xDRs is received. Each xDR can include a record of unique data fields. An xDR may be a call data record (CDR), internet protocol data record (IPDR) and the like. A plurality of xDRs can form together a stream. The xDR vector may be unparsed, therefore parsing an unparsed xDR for each unparsed xDR of the plurality of xDRs may be performed. A stream may be implemented in the form of a matrix, such that each column of the matrix corresponds to a single data field of the unique data fields. A data field may contain information values or measurement values. An information value may be a caller identification (ID), country code, cell tower ID and the like. The information value may be selected from a list of keys. Measurement values may be data volume, call duration and the like. Typically, the plurality of xDRs are of the same type (i.e. all CDRs or all IPDRs). In certain embodiments transposing each xDR vector of the plurality of xDRs is performed. In 120 the stream is stored in a memory. In 130 the stream is provided to the GPGPU. In 140 an index vector of xDRs is created, wherein each xDR is assigned a unique index within the index vector. In 150 the index vector of xDRs is sorted with respect to at least a key of a unique data field. The index vector of xDRs is stored in a memory of the GPGPU in 160. In 170 the sorted keys are stored in a memory. In 180 a selection of at least a unique data field is performed. In certain embodiments, a plurality of unique data fields are selected. Each unique data field may be processed on a dedicated group of worker threads of the GPGPU. In 190 a plurality of unique data field values are provided to the GPGPU as a stream of values. In 195 the stream of values is sorted with respect to the sorted index vector of xDRs. In certain embodiments, the sorted stream of values is stored in a memory.

Where it is advantageous, aggregation of the stream may be performed. Aggregation is performed with respect to the sorted index vector and keys selected from a unique data field. An aggregating unique data field is selected from a plurality of unique data fields. The values of each unique data field of the plurality of unique data fields are aggregated with respect to the key (or keys) of the aggregating data field to form an aggregated stream. In some embodiments, the aggregated stream is stored in a memory. In certain embodiments, the plurality of xDRs may require storage in a memory larger than the available memory of the GPGPU. A stream may then be broken into a plurality of chunks. The methods described herein are performed on each chunk of the plurality of chunks. The sorted index vectors are merged for each of the plurality of chunks to create a merged index vector.

Figure 2A:
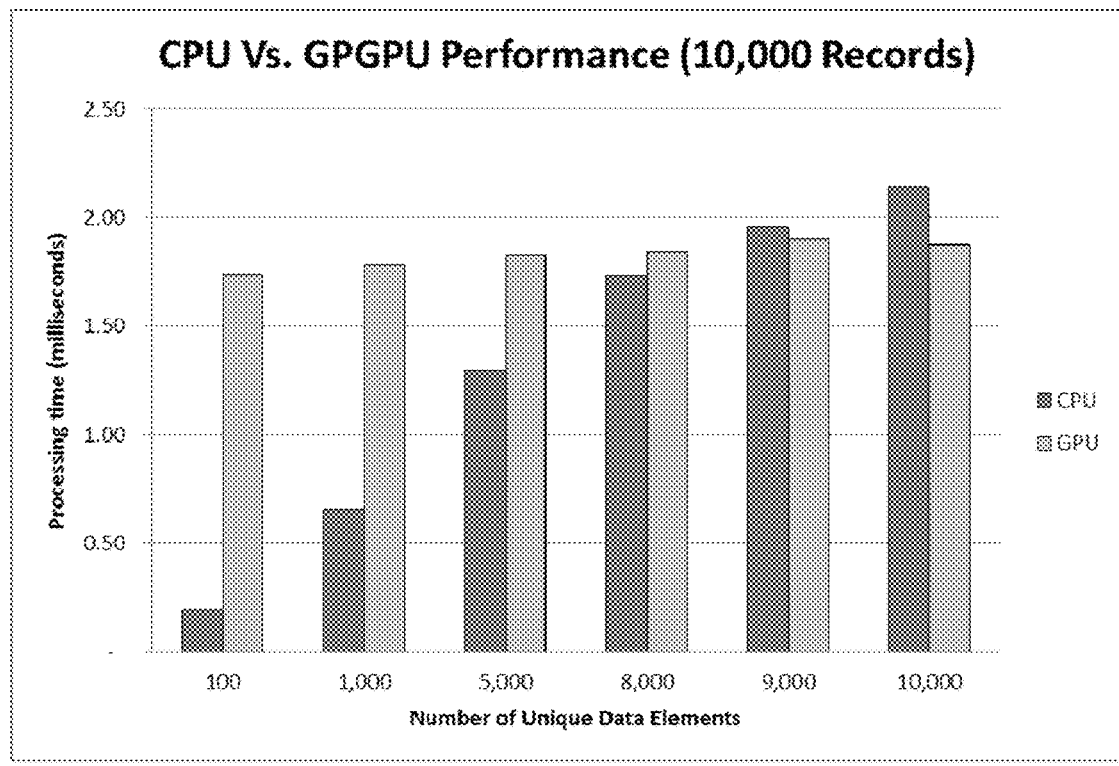
FIG. 2A—is a graph comparing performance in processing time (in milliseconds) of ten thousand call data records (CDRs) between a central processing unit (CPU) and a GPGPU.

FIG. 2A is an exemplary graph comparing performance in processing time (in milliseconds) of ten thousand CDRs between a CPU and a GPGPU. For ten thousand CDRs and under five thousand unique data element keys, a CPU has a distinct advantage in processing time over a GPGPU. However for processing eight thousand unique data element keys, there is no distinct advantage. For processing nine thousand unique data element keys and above, the GPGPU has a small advantage.

Figure 2B:
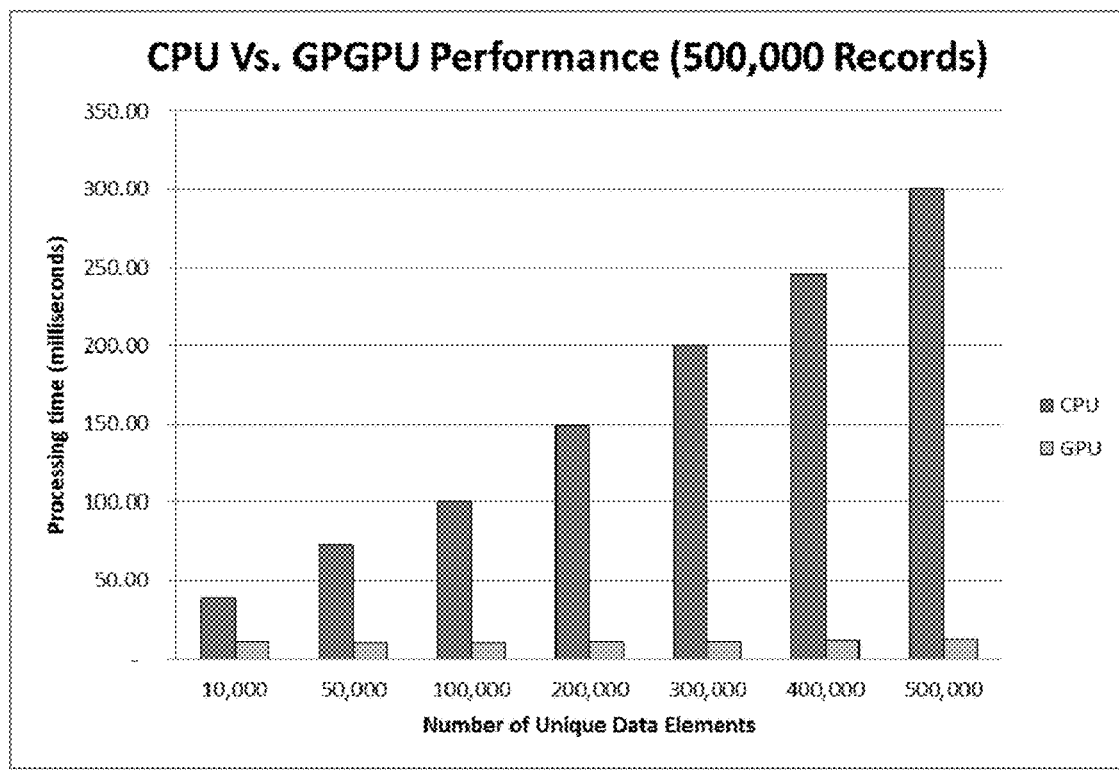
FIG. 2B—is graph comparing performance in processing time (in milliseconds) of five hundred thousand CDRs between a CPU and a GPGPU.

FIG. 2B is an exemplary graph comparing performance in processing time (in milliseconds) of an exemplary five hundred thousand CDRs between a CPU and a GPGPU. Here the advantage of processing on a GPGPU is very clear. While the amount of processing time is relatively steady for the GPGPU, the amount of processing time for the CPU rises linearly.

Figure 2C:
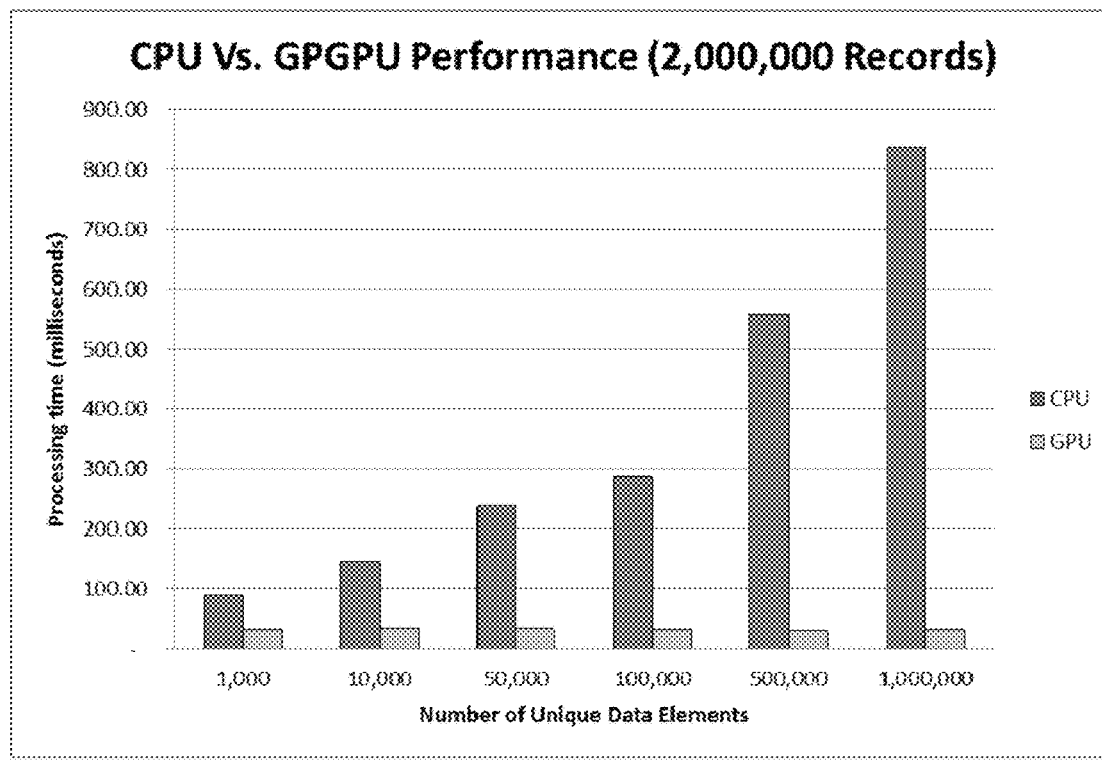
FIG. 2C—is graph comparing performance in processing time (in milliseconds) of two million CDRs between a CPU and a GPGPU.

FIG. 2C is an exemplary graph comparing performance in processing time (in milliseconds) of an exemplary two million CDRs between a CPU and a GPGPU. Again, the advantage of the GPGPU is very clear. While the amount of processing time is relatively steady for the GPGPU, the amount of processing time for the CPU rises exponentially.

Figure 3:
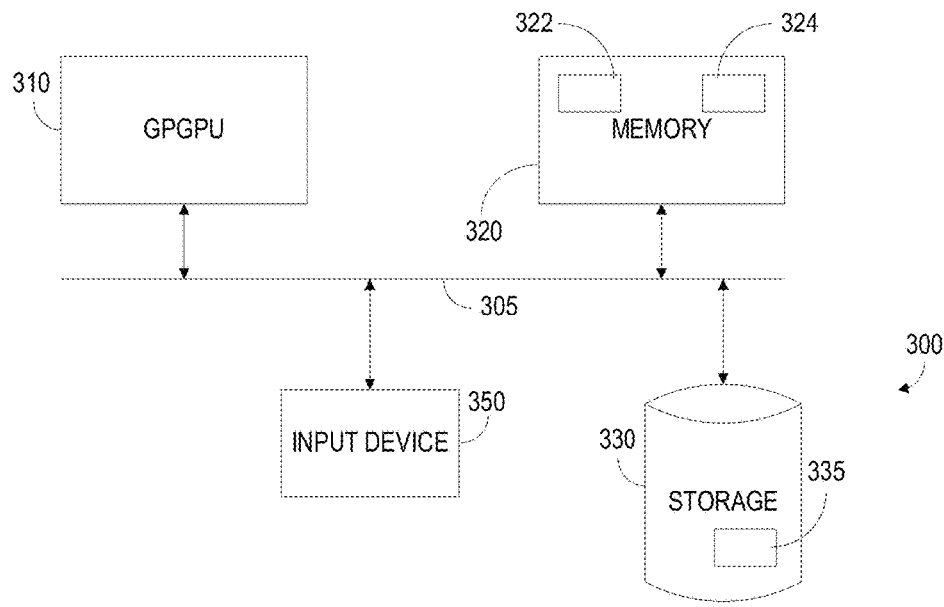
FIG. 3—is a schematic illustration of system for processing a plurality of xDRs, implemented according to an embodiment.

FIG. 3 is an exemplary and non-limiting schematic illustration of system 300 for processing a plurality of xDRs, implemented according to an embodiment. The system 300 comprises at least one GPGPU 310. The GPGPU is coupled via an example bus 305 to a memory 320. The memory 320 can include a memory portion 322 that contains instructions that when executed by the processing element 310 performs the method described in more detail herein. The memory may be further used as a working scratch pad for the GPGPU 310, a temporary storage, and others, as the case may be. The GPGPU 310 may have an internal memory (not shown) for use as a working scratch pad. The memory may comprise volatile memory such as, but not limited to random access memory (RAM), or non-volatile memory (NVM), such as, but not limited to, Flash memory. Memory 320 may further include memory portion 324 containing an index vector with respect to a plurality of xDR vectors. The GPGPU 310 may be coupled to an input 350. The GPGPU 310 may be further coupled with a database 330. Database 330 may be used for the purpose of holding a copy of the method executed in accordance with the disclosed technique. Database 330 may further comprise storage portion 335 containing a stream formed from a plurality of xDR vectors, an aggregated stream. In an embodiment, the system 300 is configured to execute the methods described herein with respect of FIG. 1. This method may be hardwired or, presented as a set of instructions to be executed by the GPGPU 310. In certain embodiments, the system may further include a central processing unit (CPU) (not shown). The CPU may execute instructions corresponding to certain steps of the methods described herein with respect of FIG. 1, while the GPGPU may execute other instructions with respect of the methods, so that each instruction is executed on the processing element optimal for the execution. In some embodiments, the GPGPU 310 may be replaced by a stream processor configured to perform the methods as disclosed herein.

The principles of the disclosure can be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as a processing unit ("CPU" and/or "GPGPU"), a memory, and input/output interfaces. The computer platform may also include an operating system and microinstruction code. The various processes and functions described herein may be either part of the microinstruction code or part of the application program, or any combination thereof, which may be executed by a CPU, GPGPU or combination thereof, whether or not such computer or processor is explicitly shown. In addition, various other peripheral units may be connected to the computer platform such as an additional data storage unit and a printing unit and/or display unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for processing, by at least a processor, a plurality of communications-related data records (DRs), the method comprising:
   receiving, by the at least a processor, a plurality of communications-related DRs, wherein the DR comprises at least one call data record (CDR), and at least one internet protocol data record (IPDR), each communications-related DR of said plurality of the communications-related DRs, comprising a vector of unique data fields, each unique data field corresponding to one or more keys;
   parsing, by the at least a processor, any unparsed DR for each unparsed communications-related DR of the plurality of communications-related DRs;
   storing, by the at least a processor, the plurality of communications-related DRs in a primary memory;
   generating, by the at least a processor, an index vector of DRs, wherein each communications-related DR of the plurality of communications-related DRs is assigned a unique index identifier, such that each unique index identifier corresponds only to one communications-related DR of the plurality of communications-related DRs;
   storing the index vector of DRs in a GPU memory of a general purpose graphic processing unit (GPGPU), wherein the GPU memory of the GPGPU is not the primary memory;
   generating a sorted index vector of DRs by the GPGPU based on at least a key of at least a unique data field;
   storing the sorted index vector of DRs in the GPU memory of the GPGPU;
   receiving, by the at least a processor, a selection of at least a unique data field from the vector of unique data fields;
   providing, by the at least a processor, a plurality of unique data field values to the GPGPU;
   creating, by the at least a processor, a sorted vector of the plurality of unique data field values related to the sorted index vector of communications-related DRs;
   transposing, by the at least a processor, each communications-related DR vector of the plurality of communications-related DRs, the plurality of transposed DRs comprising together a transposed stream; and
   storing the transposed stream in the primary memory.

2. The computerized method of claim 1, further comprising:
   reducing, by the GPGPU, a stream by at least a key of the at least a unique data field.

3. The computerized method of claim 2, wherein reducing further comprises:
   selecting an aggregating unique data field; and
      aggregating the values of each unique data field of the sorted plurality of unique data field values related to at least a key of the aggregating data field.

4. The computerized method of claim 1, further comprising:
   creating, by the at least a processor, a plurality of chunks from the plurality of DRs, each chunk comprising at least a DR; and
   performing the method of claim 1 on each chunk of the plurality of chunks.

5. The computerized method of claim 4, further comprising:
   merging the sorted index vector of each of the plurality of chunks to comprise a merged index vector.

6. The computerized method of claim 4, further comprising:
   receiving a selection of at least a unique data field from the vector of unique data fields;
   providing, for each chunk, a plurality of unique data field values to the GPGPU; and
   creating, for each chunk, a sorted vector of the plurality of unique data field values related to the sorted index vector of DRs.

7. The computerized method of claim 6, further comprising:
   reducing, by the GPGPU, each chunk by at least a key of the at least a unique data field.

8. The computerized method of claim 7, wherein reducing further comprises:
   selecting an aggregating unique data field; and
      aggregating, for each chunk, the values of each unique data field of the sorted plurality of unique data field values related to at least a key of the aggregating data field.

9. The computerized method of claim 8, further comprising:
   merging the plurality of chunks.

10. The computerized method of claim 1, wherein a plurality of unique data fields are selected and each unique data field is processed on a dedicated group of worker threads of the GPGPU.

11. A system configured to process a plurality of communications-related data records (DRs), the system comprising:
   at least a processor;
   a general purpose graphic processing unit (GPGPU);
   a network interface communicatively coupled to the GPGPU and the at least a processor; and
   a first memory communicatively coupled to the GPGPU and the at least a processor, the first memory comprising instructions that when executed configure the system to:
      receive, by the at least a processor a plurality of communications-related DRs, wherein the communications-related DR comprises at least one or more of: a call data record (CDR), or an internet protocol data record (IPDR), and each communications-related DR comprising a vector of unique data fields, each unique data field corresponding to one or more keys;
      parse, by the at least a processor, any unparsed DR for each unparsed communications-related DR of the plurality of communications-related DRs;
      store, by the at least a processor, the plurality of communications-related DRs in a primary memory;
      generate an index vector of DRs,
         wherein each communications-related DR of the plurality of communications-related DRs is assigned a unique index identifier, such that each unique index identifier corresponds only to one communications-related DR of the plurality of communications-related DRs;
      store the index vector of DRs in a GPGPU memory, wherein the GPGPU memory is not the primary memory;
      generating a sorted index vector of DRs by the GPGPU based on at least a key of at least a unique data field;
      store the sorted index vector of DRs in the GPGPU memory of the GPGPU;

receive a selection of at least a unique data field from the vector of unique data fields;

provide a plurality of unique data field values to the GPGPU;

create a sorted vector of the plurality of unique data field values related to the sorted index vector of DRs;

transpose, by the at least a processor, each DR vector of the plurality of DRs, the plurality of transposed DRs comprising together a transposed stream; and store the transposed stream in the primary memory.

12. The system of claim 11, wherein the first memory comprises an instruction that when executed by the GPGPU causes the system to:

reduce a stream by at least a key of the at least a unique data field.

13. The system of claim 12, wherein the first memory comprises an instruction that when executed by the GPGPU causes the system to:

select an aggregating unique data field; and aggregate the values of each unique data field of the sorted plurality of unique data field values related to at least a key of the aggregating data field.

14. The system of claim 11, wherein the first memory comprises further instructions that when executed by the at least a processor_causes the system to:

create a plurality of chunks from the plurality of DRs by the at least a processor, each chunk comprising at least a DR; and perform the instructions of claim 11 with respect to each chunk of the plurality of chunks.

15. The system of claim 14, wherein the first memory comprises further instructions that when executed by the at least a processor configure the system to:

merge the sorted index vector of each of the plurality of chunks to comprise a merged index vector by the at least a processor.

16. The system of claim 14, wherein the first memory comprises further instructions that when executed by the at least a processor configure the system to:

receive a selection of at least a unique data field from the vector of unique data fields by the at least a processor;

provide, for each chunk, a plurality of unique data field values to the GPGPU; and create, for each chunk, a sorted vector of the plurality of unique data field values related to the sorted index vector of DRs.

17. The system of claim 16, wherein the first memory comprises further instructions that when executed by the at least a processor configure the system to:

reduce, by the GPGPU, each chunk by at least a key of the at least a unique data field.

18. The system of claim 17, wherein the first memory comprises instructions that when executed by the at least a processor to reduce further configure the system to:

select an aggregating unique data field; and aggregate, for each chunk, the values of each unique data field of the sorted plurality of unique data field values related to at least a key of the aggregating data field.

19. The system of claim 18, wherein the first memory comprises further instructions that when executed by the at least a processor_configure the system to:

merge the plurality of chunks.

20. The system of claim 11, wherein a plurality of unique data fields are selected and the first memory comprises an instruction that when executed by the GPGPU causes the system to:

process each unique data field on a dedicated group of worker threads of the GPGPU.

21. The system of claim 11, wherein the at least a processor is a central processing unit (CPU).

22. The system of claim 11, wherein the system is further configured to determine the efficiency of execution of each instruction from the first memory by each of:

the at least a processor, and the GPGPU.

23. The system of claim 22, wherein the at least a processor and the GPGPU each execute the instructions which either the at least a processor or the GPGPU is more efficient at executing.

24. A nontransitory computer program product embodied on a nontransitory_computer accessible medium, the computer program product comprising instructions, which when executed by at least a processor, performs a method of processing a plurality of communications-related data records (DRs) on a general purpose graphic processing unit (GPGPU), the method comprising:

receiving, by the at least a processor, a plurality of communications-related DRs, wherein the communications-related DR comprises at least one or more of: at least one call data record (CDR), or at least one internet protocol data record (IPDR), each communications-related DR of said plurality of the communications-related DRs, comprising a vector of unique data fields, each unique data field corresponding to one or more keys;

parsing, by the at least a processor, any unparsed DR for each unparsed communications-related DR of the plurality of communications-related DRs;

storing, by the at least a processor, the plurality of communications-related DRs in a primary memory;

generating, by the at least a processor, an index vector of communications-related DRs, wherein each communications-related DR of the plurality of communications-related DRs is assigned a unique index identifier, such that each unique index identifier corresponds only to one communications-related DR of the plurality of communications-related DRs;

storing the index vector of DRs in a GPU memory of the GPGPU, wherein the GPU memory of the GPGPU is not the primary memory;

generating a sorted index vector of DRs by the GPGPU based on at least a key of the at least a unique data field;

storing the sorted index vector of DRs in the GPU memory of the GPGPU;

receiving, by the at least a processor, a selection of at least a unique data field from the vector of unique data fields;

providing, by the at least a processor, a plurality of unique data field values to the GPGPU;

creating, by the at least a processor, a sorted vector of the plurality of unique data field values related to the sorted index vector of DRs;

transposing, by the at least a processor, each DR vector of the plurality of DRs, the plurality of transposed DRs comprising together a transposed stream; and storing the transposed stream in the primary memory.

25. The computer program product of claim 24, wherein the method further comprises:

reducing, by the GPGPU, a stream by at least a key of the at least a unique data field.

26. The computer program product of claim 25, wherein the reducing of the method further comprises:

selecting an aggregating unique data field; and aggregating the values of each unique data field of the sorted plurality of unique data field values related to at least a key of the aggregating data field.

27. The computer program product of claim 24, wherein the method further comprises:
   creating, by the at least one processor, a plurality of chunks from the plurality of DRs, each chunk comprising at least a DR; and
   performing the method of claim 24 on each chunk of the plurality of chunks.

28. The computer program product of claim 27, wherein the method further comprises:
   merging the sorted index vector of each of the plurality of chunks to comprise a merged index vector, by the at least a processor.

29. The computer program product of claim 27, wherein the method further comprises:
   receiving a selection of at least a unique data field from the vector of unique data fields;
   providing, for each chunk, a plurality of unique data field values to the GPGPU; and
   creating, for each chunk, a sorted vector of the plurality of unique data field values related to the sorted index vector of DRs.

30. The computer program product of claim 29, wherein the method further comprises:
   reducing, by the GPGPU each chunk by at least a key of the at least a unique data field.

31. The computer program product of claim 30, wherein the reducing further comprises:
   selecting an aggregating unique data field; and
      aggregating, for each chunk, the values of each unique data field of the sorted plurality of unique data field values related to at least a key of the aggregating data field.

32. The computer program product of claim 31, wherein the method further comprises:
   merging the plurality of chunks.

33. The computer program product of claim 24, wherein a plurality of unique data fields are selected and each unique data field is processed on a dedicated group of worker threads of the GPGPU.

34. The computer program product of claim 24, wherein the method further comprises at least one of:
   executing the method on the at least a processor, wherein the at least a processor comprises a central processing unit (CPU) communicatively coupled to a first memory;
   determining efficiency of execution by each of: the CPU, and the GPGPU; or
   executing instructions, by a CPU or the GPGPU, depending upon which of either the CPU or the GPGPU is more efficient at executing the instructions.

* * * * *